United States Patent [19]

Snedden

[11] 4,120,014

[45] Oct. 10, 1978

[54] DIVIDING TIMER

[75] Inventor: William H. Snedden, Newstead, N.Y.

[73] Assignee: Westinghouse Electric Corp., Pittsburgh, Pa.

[21] Appl. No.: 735,920

[22] Filed: Oct. 27, 1976

[51] Int. Cl.$^2$ ............................................. H01H 47/18
[52] U.S. Cl. .................................. 361/196; 307/293; 361/203
[58] Field of Search .............................. 361/196–201, 361/203; 326/127, 128, 129, 185; 307/141, 141.4, 293, 294; 331/111, 108 D, 179

[56] References Cited

U.S. PATENT DOCUMENTS 3,783,392   1/1974   Drake et al. ........................ 328/127

OTHER PUBLICATIONS

"Two Op Amps Simplify Design of Oscillator", Electronics, 4/1970, p. 92.
"Period of Sawtooth Ramp Extends to 5 Hours", Electronics, 6/66.

*Primary Examiner*—Harry E. Moose, Jr.
*Attorney, Agent, or Firm*—James J. Wood

[57] ABSTRACT

This disclosure relates to a timer for subdividing a finite time interval into a number of periods. An operational amplifier is connected as an integrator with a capacitor in its feedback path. An adjustable resistance network, enabling the selection of a fixed ohmic magnitude, is connected to the input of the operational amplifier and to a source of d.c. potential. A detector, connected to the output of the operational amplifier, determines when the capacitor has reached a fixed potential, by actuating a relay, the relay having normally open contacts in shunt with the capacitor, the closure of the contacts discharging the capacitor — the charge-discharge cycle is then repeated. By selection of the ohmic magnitude for the resistance network, the operator can divide the time interval into equal periods in accordance with the number of times that the capacitor reaches the detected potential level.

1 Claim, 5 Drawing Figures

DIVIDING TIMER

BACKGROUND OF THE INVENTION

1. Field of the Invention

This invention relates to a timer for dividing a time period into equal subdivisions.

2. Description of the Prior Art

Today, the digital computer, with its tremendous capacity for rapid calculation, provides ready answers to problems which were previously ignored simply because the arithmetic process was tedious and cumbersome. The task now is to effectively make use of the answers which the computer readily provides.

In the environment of the present invention, it is required to divide a fixed time interval into a number of equal parts as per the computer solution. This of course, has been done in the prior art. The instant invention however provides a novel, simple, and inexpensive solution for dividing a time interval into any number of equal parts to satisfy the most demanding solution.

SUMMARY OF THE INVENTION

A dividing timer is provided in which an operational amplifier is connected as an integrator with a capacitor in its feedback path. An adjustable resistance means is connected to the input of the operational amplifier and to a source of d.c. potential. Means are provided for detecting when the capacitor has charged to a fixed voltage and for discharging the capacitor. By preselecting a fixed ohmic magnitude for the resistance means, a finite time interval can be subdivided into time periods in accordance with the number of times that the capacitor reaches the fixed voltage.

The detecting means may be an additional operational amplifier and a relay. The operational amplifier is arranged as a proportional-integral controller and is connected to the output of the first operational amplifier. The relay is connected to the output of the second operational amplifier, and has a pair of normally open contacts shunting the capacitor of the first operational amplifier, the relay being activated when the capacitor reaches said fixed voltage, the contacts then closing to discharge the capacitor.

The adjusted resistance means may be a number of resistors arranged in parallel, the resistors having preselected ohmic magnitudes in accordance with a binary code such as binary coded decimal.

GENERAL ENVIRONMENT

Figure 4:
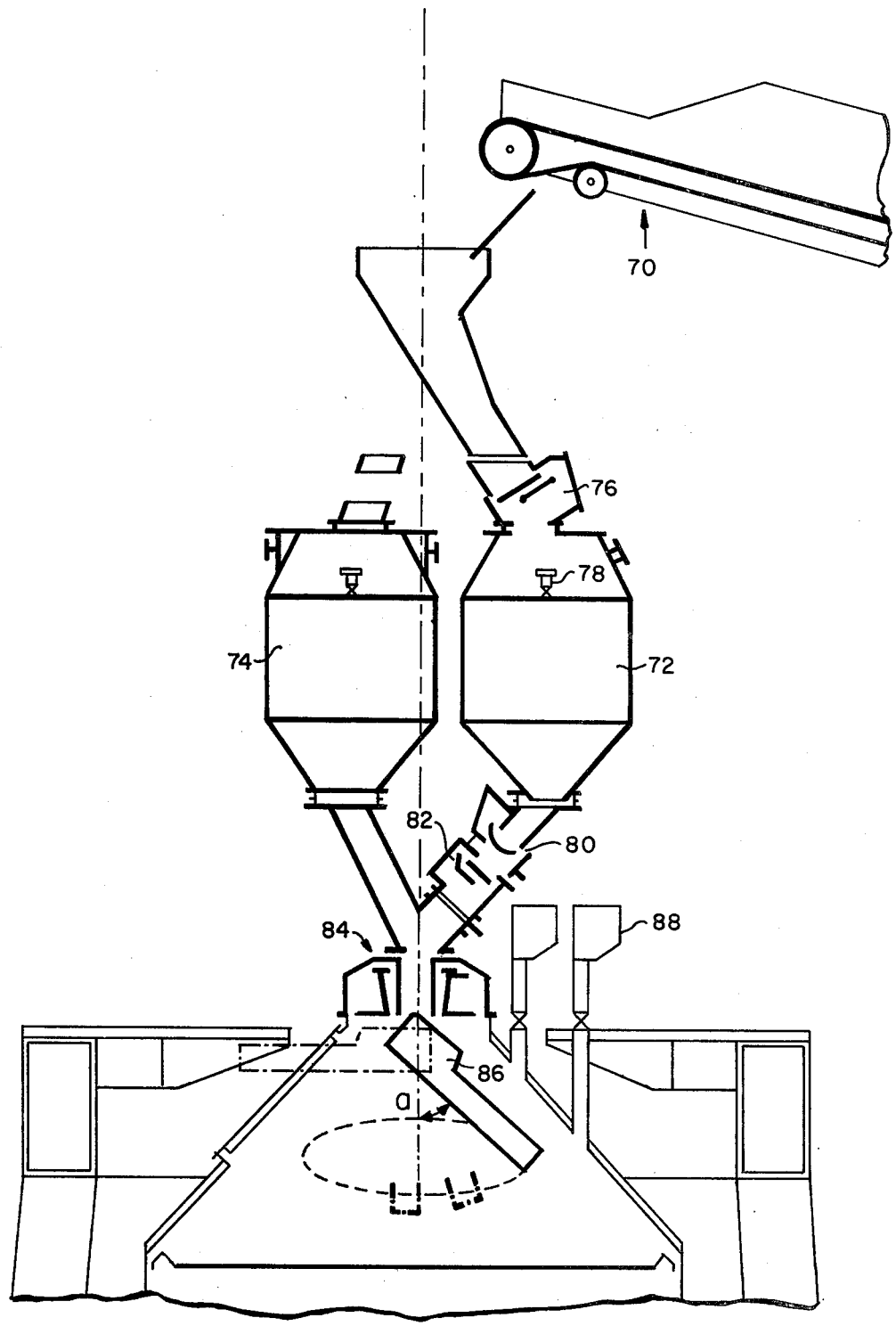
FIG. 4 is a schematic diagram of the loading mechanism for a blast furnace, the environment in which the invention was conceived.

Although the instant invention finds utility in many different environments, it was in fact conceived for use in loading raw materials into a blast furnace, by the arrangement depicted in FIG. 4, developed and patented by Paul Wurth Cy of Luxembourg.

Referring now briefly to FIG. 4, the raw materials to be loaded into the blast furnace are transported either by conveyor belt or skip charging means, indicated generally at 70. The raw materials are emptied into a pair of lock hoppers identified at 72 and 74 which are mounted on top of the blast furnace. Typically, one lock hopper 72 may contain coke, and the other hopper 74 may contain ore and limestone. The material in each hopper is under the discipline of various seals and gates to insure controlled deposition of the burden. For example, hopper 72 includes an upper sealing valve 76, weigh equipment for hopper empty indication 78, a material flow control gate 80, a lower sealing valve 82, and a distribution housing indicated generally at 84. The material in the hopper 72 or 74 is emptied into a distribution chute 86, which is adjustable as regards: (a) the vertical angle $\alpha$ and the rotational angle $\beta$ (not identified in FIG. 4). Equipment within a housing 88, enables burden level detection by mechanical stock rods or by neutronic equipment.

The Wurth arrangement of FIG. 4 enables a number of different charging schemes for the deposition of charging material. The adjustment of the angle $\alpha$ enables the material to be poured in concentric rings.

Segmental charging of the furnace is also possible. When the burden level detection 88 determines that there is a crater or cave-in of the burden, the distribution chute 86 can be oscillated back and forth in the rotational angle $\beta$ to deposit extra material to fill in this void. The angle $\beta$ is measured in the horizontal plane of rotation of the chute, that is, the chute rotates through 360° and the void may extend for example from rotational angle 68° to rotational angle 100°. The angle $\alpha$ may make any angle with the vertical, suppose for example 60°. Thus will angle $\alpha$ equal to 60°, as the chute angular displacement reaches 60°, the chute will then be caused to oscillate between 60° and 120° of rotation, until the void is filled in. Preferably the blast furnace is operated in cooperation with a digital computer so that the angles $\alpha$ and $\beta$ are determined with a fair degree of accuracy. The invention of FIG. 1 is addressed to the ready selection of a plurality of vertical angles $\alpha_1$, $\alpha_2$, $\alpha_3$, $\alpha_4$, etc., when the identification of the angular magnitude is known either empirically or preferably by computer selection.

DESCRIPTION OF A PREFERRED EMBODIMENT

Figure 1:
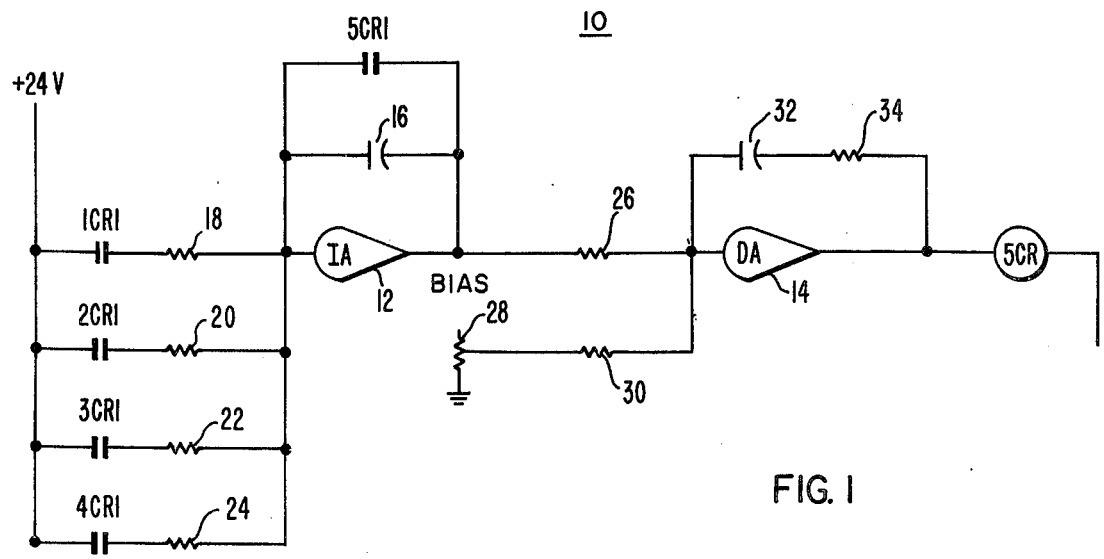
FIG. 1 is an electrical schematic of the dividing timer in accordance with the invention.

Referring now to FIG. 1, the dividing timing means of the invention indicated generally at 10, comprises operational amplifiers 12 and 14.

The operational amplifier 12 includes a capacitor 16 shunted by a pair of normally open relay contacts 5CR1. The input to operational amplifer 12 comprises resistors 18, 20, 22, 24 serially connected with normally open relay contacts 1CR1, 2CR1, 3CR1 and 4CR1 respectively, the serial combination being connected in parallel between a +24v supply and the input to the operational amplifier 12. (Note a relay coil is identified as —CR, and its cooperating contact(s) by —CR1, —CR2, etc.).

The output of the operational amplifier 12 is connected to the input of operational amplifier 14, connected as a proportional-integral controller through resistor 26. Potentiometer 28 and resistor 30 are also connected to the input of amplifier 14. The feedback path of amplifier 14 comprises serially connected capacitor 32 and resistor 34, while relay coil 5CR is connected to the output.

Figure 2:
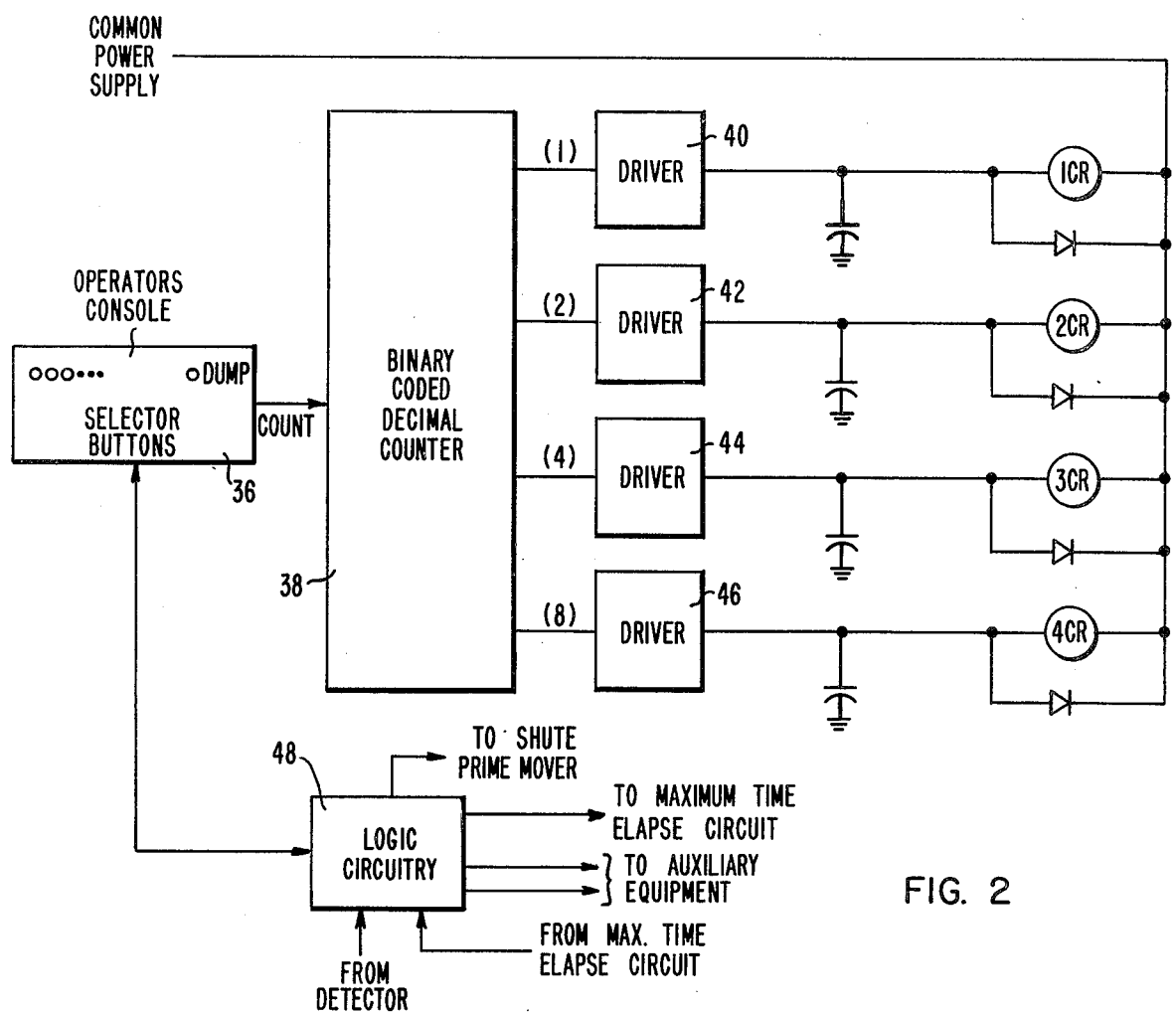
FIG. 2 is a block diagram showing the circuitry used in selecting the ohmic magnitude for the resistance network of FIG. 1.

The input commands for initiating the actuation of the contacts 1CR1 ... 4CR1 are shown schematically in FIG. 2. At the operator's console 36, count commands are sent to the binary coded decimal counter 38. In this particular embodiment, the counter has four outputs which are connected to drivers 40, 42, 44, 42 as shown; the outputs of these drivers are connected to relay coils 1CR, 2CR, 3CR and 4CR, respectively. Logic circuitry is indicated at 48.

Figure 3:
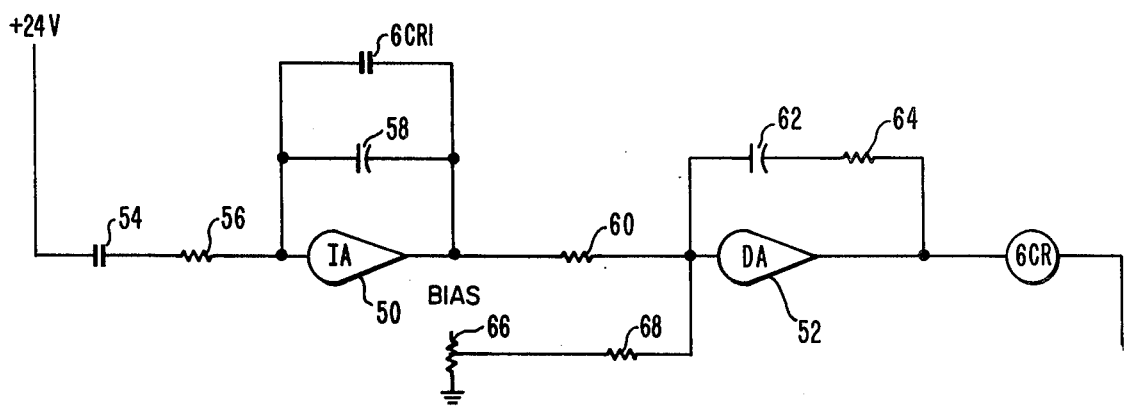
FIG. 3 is an electrical schematic for the maximum elapse time circuit.

A maximum time elapse circuit is depicted in FIG. 3, and comprises operational amplifiers 50 and 52. A 24 v.d.c. regulated power source is connected to the input of amplifier 50 through normally open contacts 54 and resistor 56. The feedback path of amplifier 50 includes a capacitor 58 shunted by normally open contacts 6CR1. The output of amplifier 50 is connected to operational amplifer 52 through resistance 60. The feedback path of amplifier 52 includes serially connected capacitor 62 and resistor 64. Potentiometer 66 and resistor 68 are also connected to the input of amplifier 52 as shown.

OPERATION

The resistors 18, 20, 22, 24 are weighted (8-4-2-1) in accordance with the BCD code. Thus excluding zero, a choice of 15 possible numbers is available.

| 8421 | Decimal | |
|------|---------|---|
| 0001 | 1 | |
| 0010 | 2 | |
| 0011 | 3 | |
| 0100 | 4 | etc. |

The ohmic magnitudes of the resistors are respectively as follows:

| Resistor | Ohmic Magnitude | Code |
|----------|-----------------|------|
| 18 | 10 megohms | 1 |
| 20 | 5 megohms | 2 |
| 22 | 2.5 megohms | 4 |
| 24 | 1.25 megohms | 8 |

For the amplifier 12 the ratio of the output voltage $E_o$ to the input voltage $E_i$ is:

$$E_o/E_i = -1/fT \quad (1)$$

$$T = RC \quad (2)$$

where
$T$ = the time constant
$R$ = the resistance of the resistors selected from the parallel combination viz 18, 20, 22, 24, and,
$C$ = the capacitance of capacitor 16

The operational amplifier 14 is a voltage detector. As the capacitor 16 of amplifier 12 charges, the capacitor 32 in the feedback path of amplifier 14 also builds up a charge. When a finite level is reached (the detected level) current flows through coil 5CR and contacts 5CR1 close, shorting out capacitor 16, and the charging cycle begins again.

The operational amplifier 12 is an integrator. In the dividing timer of FIG. 1, R (equation 2) is varied in a binary counting manner (8, 4, 2, 1) such that the selection of four inputs will cause the voltage of the integrators to reach the detected voltage level in a time inversely proportional to the number selected. A practical example will serve to make this clear.

Figure 5:
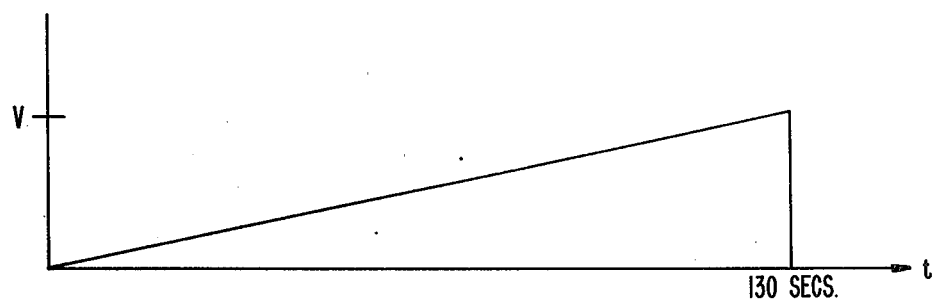
FIG. 5 is a voltage-time diagram used in explaining the operation of the invention.
Figure 5:
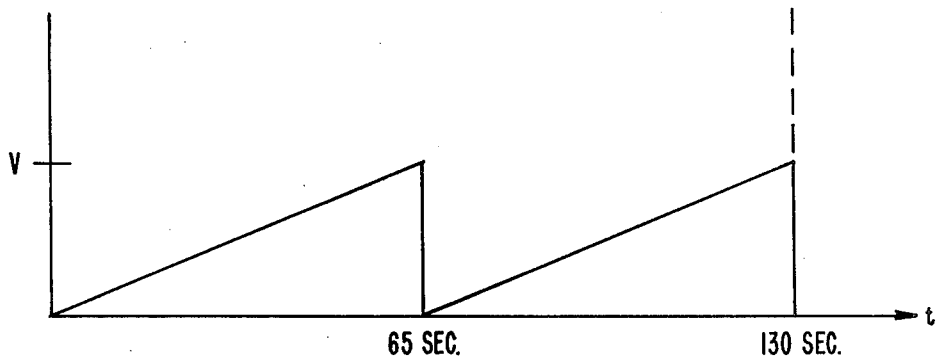
Figure 5:
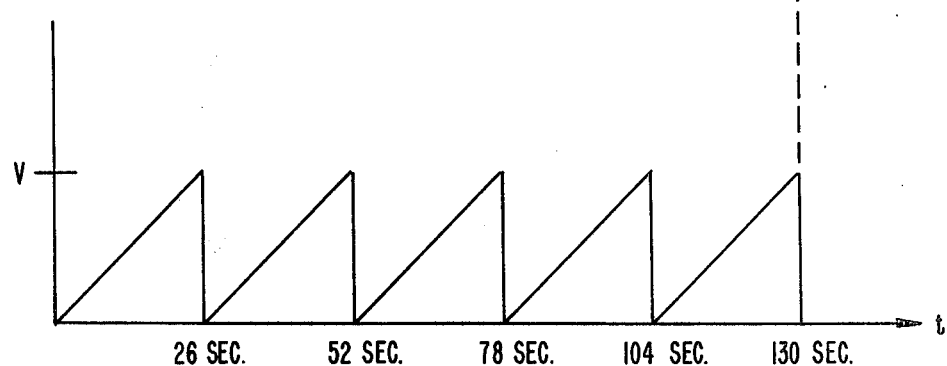

In the blast furnace environment it takes approximately 130 seconds to empty one lock hopper (72 or 74). Referring now to FIG. 5, number 1 (0001) is adjusted for 130 seconds, that is in 130 seconds, with resistor 18 selected, amplifier 14 will reach the detected voltage. If number two is selected, (0010) resistor 20 is connected at the input of amplifier 12, and the detected voltage is reached in one half the time, i.e., 65 seconds. Similarly, if the number 5 is selected (0101) resistors 22 and 18 are connected to the input of amplifier 12 and the detected voltage is reached in one-fifth the time or 26 seconds.

The blast furnace operator at his console 36 presses selector buttons which send pulses to the counter 38. When the operator presses the dump button, signals are sent to energize selected drivers which in turn energizes the appropriate relays (1CR-4CR). Each relay coil which is energized closes its associated relay contacts so that the proper resistors (18, 20, 22, 24) are electrically in parallel in the input to amplifier 12.

At the same time that the dump button is pressed, the logic circuitry 48 actuates a relay which closes contacts 54, so that integrator 50 begins to charge. The time constant here is such that detector 52 detects at a maximum time elapse period which is somewhat greater than 130 seconds. When this voltage is detected, relay 6CR is energized closing contacts 6CR1 to short out capacitor 58, and a signal is sent (through additional contacts on relay 6CR) to the logic circuitry 48 advising that the dump operation is completed or should be completed at this time.

During the course of the dumping operation, each time relay 5CR picks up, a signal is sent (through additional contacts on relay 5CR) to the logic circuitry 48, which then sends a command signal to the chute prime mover and the chute 86 is indexed to the next angular position.

While the instant invention has been described with a timer divisor of 15, the real time limitations are frequency and total elapsed time. Thus total time could be 20 minutes, with maximum frequency equal to 10 Hz, which gives the divisor a maximum of 12,000.

What we claim is:
1. A dividing timer comprising:
   a. a first operational amplifier connected as an integrator and having a first capacitor in its feedback path;
   b. a plurality of resistors in parallel, connected to the input of said first operational amplifier and to a source of d.c. potential, the resistors having ohmic magnitude proportional to a binary code; the selected resistors of the parallel combination providing a fixed ohmic magnitude;
   c. A second operational amplifier, arranged as a proportional integral controller, connected to the output of said first operational amplifier;
   d. a relay, connected to the output of said second operational amplifier, and having a pair of normally open relay controls shunting said first capacitor, whereby by preselecting said fixed ohmic magnitude, a finite time interval can be subdivided into time periods in accordance with the number of times that the first capacitor reaches said fixed voltage during said finite time interval.

* * * * *